United States Patent [19]

Udagawa et al.

[11] Patent Number: 5,240,261
[45] Date of Patent: Aug. 31, 1993

[54] STEEL LAMINATE GASKET

[75] Inventors: Tsunekazu Udagawa, Ichikawa; Susumu Inamura, Tokyo, both of Japan

[73] Assignee: Ishikawa Gasket Co., Ltd., Tokyo, Japan

[21] Appl. No.: 683,430

[22] Filed: Apr. 10, 1991

Related U.S. Application Data

[63] Continuation-in-part of Ser. No. 193,215, May 11, 1988, Pat. No. 5,054,795, which is a continuation of Ser. No. 928,937, Nov. 10, 1986, abandoned.

[51] Int. Cl.$^5$ .............................................. F16J 15/08
[52] U.S. Cl. .................. 277/235 B; 277/236; 277/234
[58] Field of Search .................... 277/235 B, 234, 236

[56] References Cited

U.S. PATENT DOCUMENTS

| | | | |
|---|---|---|---|
| 4,714,260 | 12/1987 | Udagawa | 277/235 B |
| 4,739,999 | 4/1988 | Ishii et al. | 277/234 |
| 4,750,749 | 6/1988 | Nicholson | 277/235 B X |
| 4,759,585 | 7/1988 | Udagawa | 277/235 B |
| 4,834,399 | 5/1989 | Udagawa et al. | 277/235 B X |
| 4,867,462 | 9/1989 | Udagawa | 277/235 B |
| 4,896,891 | 1/1990 | Udagawa | 277/235 B |
| 4,898,396 | 2/1990 | Udagawa | 277/235 B |
| 5,054,795 | 10/1991 | Udagawa et al. | 277/235 B |
| 5,058,908 | 10/1991 | Udagawa | 277/235 B |

FOREIGN PATENT DOCUMENTS

| | | | |
|---|---|---|---|
| 0440831 | 8/1991 | European Pat. Off. | |
| 2849018 | 5/1980 | Fed. Rep. of Germany | 277/235 B |
| 160549 | 7/1986 | Japan | 277/235 B |
| 255253 | 11/1986 | Japan | 277/235 B |
| 63-210464 | 9/1988 | Japan | |
| 1-6563 | 1/1989 | Japan | |

OTHER PUBLICATIONS

Cherry Steel Laminate Gasket Technical Report by Isikawa Gasket Co. LTD 1979.

*Primary Examiner*—William A. Cuchlinski, Jr.
*Assistant Examiner*—James K. Folker
*Attorney, Agent, or Firm*—Kanesaka and Takeuchi

[57] ABSTRACT

A steel laminate gasket of the invention is installed in an internal combustion engine having at least one hole therein. The gasket comprises a first metal plate, and a second metal plate situated under the first metal plate. The first plate includes a first sealing device around a first hole to be sealed, and an embossed portion between the first sealing device and a base portion of the first plate. The second plate has a second hole larger than the first sealing device, and a second sealing device around the second hole. When the first and second plates are assembled, the second plate does not pile the first sealing device. The gasket is securely sealed by the combination of the first and second sealing devices and the embossed portion.

7 Claims, 2 Drawing Sheets

STEEL LAMINATE GASKET

CROSS-REFERENCE TO RELATED APPLICATION

This is a continuation in part application of Ser. No. 193,215, filed on May 11, 1988, now U.S. Pat. No. 5,054,795 which, in turn, is a continuation application Ser. No. 928,937 filed on Nov. 10, 1986, abandoned.

BACKGROUND OF THE INVENTION AND RELATED ART STATEMENT

The present invention relates to a steel laminate gasket of a very thin type.

A conventional steel laminate gasket is constructed by laminating several plates, and is provided with a complicated sealing portion around a hole to be sealed. Consequently, it is difficult to manufacture a steel laminate gasket with light weight. Also, productivity of a steel laminate gasket is poor. As a result, a steel laminate gasket is more expensive than other gaskets.

In a small engine, a gasket must be light in weight and manufactured at a low cost. However, a conventional steel laminate gasket is heavy and expensive. Therefore, a conventional steel laminate gasket is not usually used for a small size engine.

In U.S. Pat. No. 4,834,399, a gasket formed of two plates has been proposed, wherein an area around a hole is sealed by one or two sealing means formed on the plates. The gasket can securely seal around the hole as intended. However, the gasket is not suitable for sealing around a hole where a large force is applied, e.g. an engine with high compression ratio.

Accordingly, one object of the present invention is to provide a steel laminate gasket for securely sealing around a hole, which is light in weight and simple in structure.

Another object of the invention is to provide a steel laminate gasket as stated above, which can securely seal around a hole without concentrating sealing pressure at one portion.

A further object of the invention is to provide a steel laminate gasket as stated above, which can be easily and economically manufactured.

Further objects and advantages of the invention will be apparent from the following description of the invention.

SUMMARY OF THE INVENTION

A metal laminate gasket of the invention is designed to be installed in an internal combustion engine having at least one hole therein. The gasket comprises a first metal plate and a second metal plate situated under the first metal plate.

The first plate includes a first hole corresponding to the hole of the engine, and first sealing means formed around the first hole to define and seal around the same. Further, the first plate includes a base section extending substantially throughout the entire area of the gasket, and an embossed portion situated between the first sealing means and the base section. When the gasket is tightened, the first sealing means does not deform, but the embossed portion resiliently deforms to seal around the first hole outside the first sealing means.

The second plate includes a second hole, and second sealing means formed around the second hole. The diameter of the second hole is larger than the diameter of the first sealing means to permit the second plate to pile over the base section without laying over the first sealing means. When the gasket is tightened, the second sealing means deforms to resiliently seal around the hole of the engine.

In the gasket of the invention, the first sealing means and the embossed portion formed on the first plate and the second sealing means formed on the second plate are radially spaced apart from each other relative to the hole of the engine. Therefore, when the gasket is tightened, surface pressure is not concentrated at one portion and can seal widely and securely around the hole.

The embossed portion is formed of an inclined wall disposed diagonally in the gasket. The height of the inclined wall from the lowest portion to the highest portion is greater than the thickness of the first sealing means.

The first sealing means is formed of a lower section and an upper section. The lower section is connected to the inclined wall, and the upper section is turned to be located above the lower section to form a solid portion.

Since the first sealing means around the hole of the engine constitutes the solid portion, the gasket can be tightened strongly without causing deformation of the engine parts or with very little deformation even if formed. The area around the hole of the engine is sealed non-resiliently by the solid portion of the first sealing means, and sealed resiliently by the embossed portion and the second sealing means.

The thickness of the first plate is made thicker than that of the second plate so that the solid portion is thicker than the total thickness of the gasket outside thereof. Therefore, the solid portion prevents the embossed portion and the second sealing means from completely compressed when the gasket is tightened. Namely, creep relaxation of the embossed portion and the second sealing means is prevented by the solid portion.

Preferably an inner edge around the second hole of the second plate abuts against the inclined wall of the embossed portion when the first and second plates are assembled. Also, the second sealing means is formed of a bead or projection. As a result, when the gasket is tightened, the inner edge and the inclined wall push against each other by deformation of the bead or projection and the inclined wall to provide high sealing pressure at the inclined wall and the bead or projection.

DETAILED DESCRIPTION OF PREFERRED EMBODIMENTS

Figure 1:
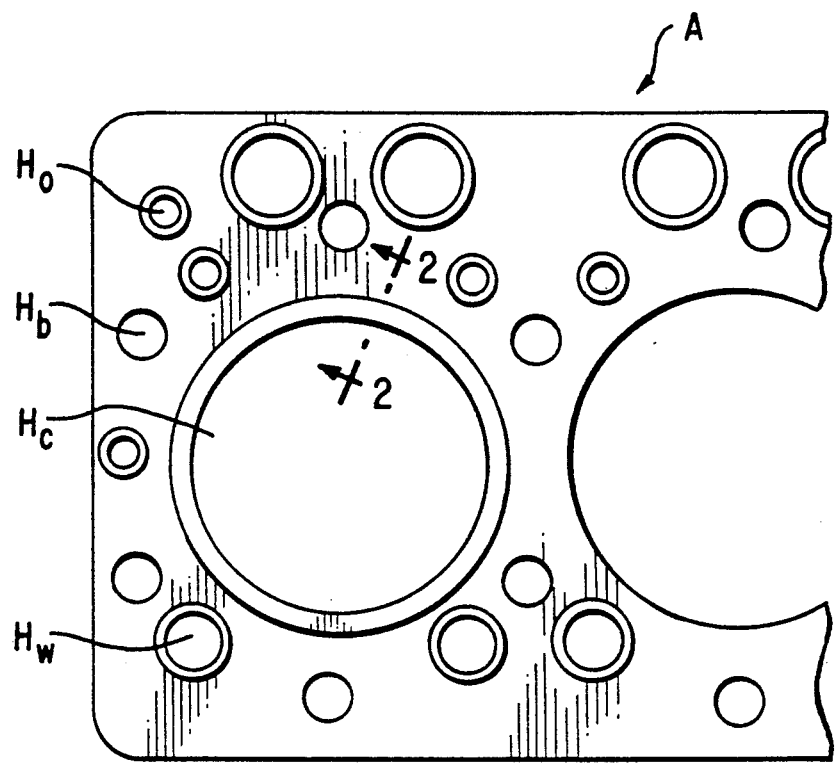
FIG. 1 is a plan view of a part of a first embodiment of a gasket of the invention.
Figure 2:
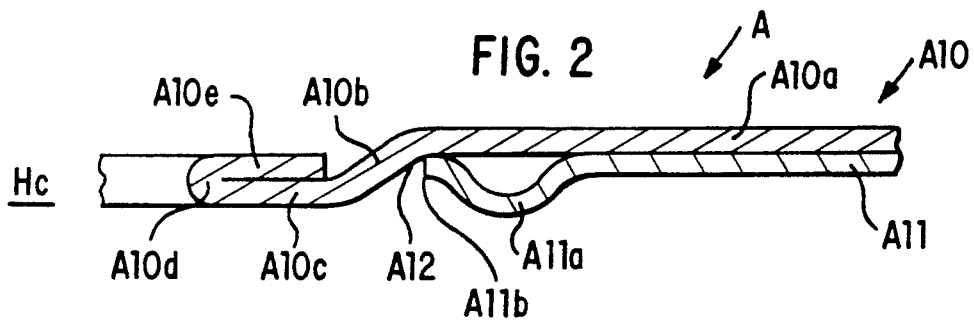
FIG. 2 is an enlarged section view taken along line 2—2 in FIG. 1.

Referring to FIGS. 1 and 2, a first embodiment A of a steel laminate gasket of the invention is shown. The gasket A is a cylinder head gasket, and includes cylinder bores Hc, water holes Hw, oil holes Ho and bolt holes Hb, as in the conventional gasket.

The sealing mechanism of the invention is applied around the cylinder bore Hc, but the same sealing mechanisms may be formed around other holes, or for other gaskets, such as a manifold gasket.

As shown in FIG. 2, the gasket A comprises an upper plate A10, and a lower plate A11 situated under the upper plate A10. The upper plate A10 includes a base section A10a extending substantially throughout the entire area of the gasket A, and an inclined wall A10b extending inwardly and downwardly from the base section A10a. A lower inner portion A10c of the upper plate A10 extends further inwardly from the inclined wall A10b, and an upper inner portion A10e is turned at a curved portion A10d and is situated above the lower inner portion A10c.

The cylinder bore Hc is defined by the curved portion A10d. Also, the upper and lower inner portions A10c, A10e constitute a solid portion around the cylinder bore Hc.

The height of the inclined wall A10b, i.e. the distance from the lower surface of the lower inner portion A10c to the upper surface of the base section A10a, is higher than the thickness of the solid portion, i.e. the distance from the lower surface of the lower inner portion A10c to the upper surface of the upper inner portion A10e. The inclined wall A10b constitutes an embossed portion.

The lower plate A11 is situated under the base section A10a of the upper plate A10 and extends substantially throughout the entire area of the gasket A. The lower plate A11 includes a hole A12, and a bead A11a around the hole A12. The size of the hole A12 must be larger than the size of the lower inner portion A10c.

In the gasket A, the size of the hole A12 is larger than the size of the inclined wall A10b so that an edge A11b of the lower plate A11 is located adjacent the inclined wall A10b. The thickness of the lower plate A11 is thinner than the thickness of the upper plate A10.

In the present invention, when the gasket A is tightened between a cylinder head and a cylinder block (both not shown), the inclined wall A10b and the bead A11a are compressed, but the upper and lower inner portions A10e, A10c form the solid portion and are not substantially compressed.

Therefore, the solid portion non-resiliently seals around the cylinder bore Hc, while the inclined wall A10b and the bead A11a resiliently seal around the cylinder bore Hc. Since the solid portion is formed around the cylinder bore Hc, when the gasket A is tightened, tightening pressure is not concentrated at one portion and is equally spread on the solid portion. Therefore, the gasket can be tightened at high tightening pressure without deformation of the cylinder bore Hc.

As explained before, the lower plate A11 is thinner than the upper plate A10. Therefore, the solid portion, i.e. the upper and lower inner portions A10e, A10c, is thicker than the total thickness of the upper and lower plates A10, A11. When the gasket A is tightened, therefore, the inclined wall A10b and the bead A11a are not completely compressed. As a result, creep relaxation of the inclined wall A10b and the bead A11a is prevented by the solid portion.

When the upper and lower plates A10, A11 are assembled, the edge A11b abuts against the inclined wall A10b. When the gasket A is tightened, since the solid portion is held between the cylinder head and cylinder block, the inclined wall A10b tries to move in the direction away from the cylinder bore Hc, while the edge A11b tries to move toward the cylinder bore Hc. Namely, when the gasket A is tightened, the edge A11b and the inclined wall A10b try to move in the opposite directions and push against each other. As a result, high surface pressure is formed at the inclined wall A10b and the bead A11a.

The gasket is sealed non-resiliently by the solid portion and resiliently by the inclined wall and the bead.

Figure 3:
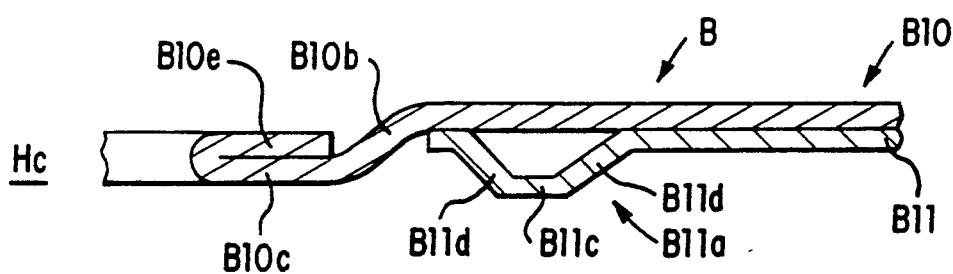
FIGS. 3–7 are section views, similar to FIG. 2, of second to sixth embodiments of the invention.

FIG. 3 shows a second embodiment B of the steel laminate gasket of the invention. The gasket B comprises an upper plate B10 with an inclined wall B10b and upper and lower inner portions B10e, B10c, and a lower plate B11, similar to the gasket A. In the gasket B, however, the lower plate B11 is provided with a bead B11a having a flat portion B11c and two side portions B11d.

In the gasket B, since the bead B11a has the flat portion B11c, when the gasket is tightened, surface pressure of the bead B11a is spread at the flat portion B11c, not concentrated at one portion. As a result, relatively high and wide surface pressure is obtained by the bead B11a.

In case a round bead, e.g. bead A11a, contacts an engine part made of an aluminum alloy and is tightened strongly, a dent may be formed on the engine part by the top of the bead. In the gasket B, since the bead B11a has the flat portion B11c, the engine part is not damaged by the bead. The gasket B operates as in the gasket A.

Figure 4:
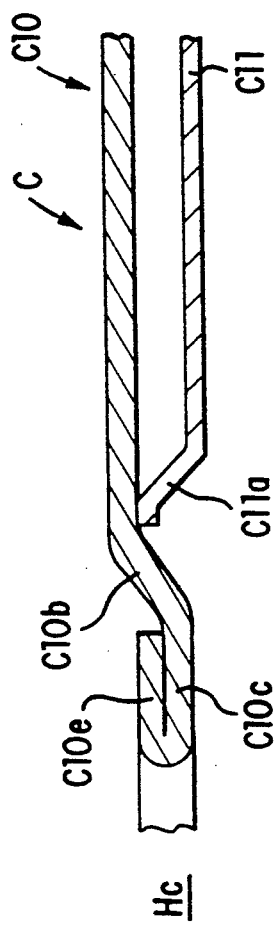

FIG. 4 shows a third embodiment C of the steel laminate gasket of the invention. The gasket C includes an upper plate C10 with an inclined wall C10b and upper and lower inner portions C10e, C10c, and a lower plate C11, similar to the gasket A. In the gasket C, however, the lower plate C11 is provided with an inclined wall C11a instead of a bead.

The inclined wall C11a is formed in case a regular bead can not be formed, such as there is not enough space for forming a bead in view of other member. When the gasket C is tightened, the inclined wall C11a deforms to seal around the cylinder bore Hc. The gasket C operates as in the gasket A.

Figure 5:
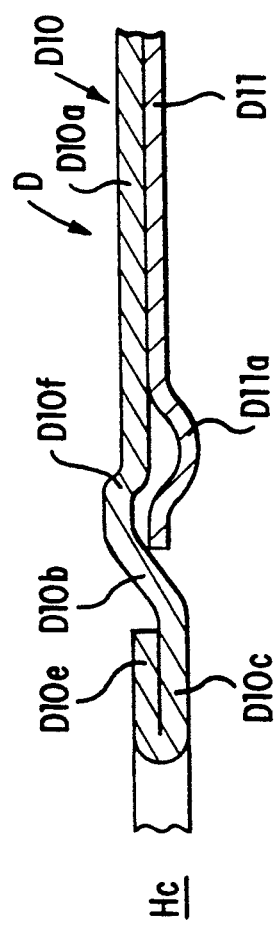

FIG. 5 shows a fourth embodiment D of a steel laminate gasket of the invention. The gasket D includes an upper plate D10 having a base section D10a, an inclined wall D10b and upper and lower inner portions D10e, D10c, and a lower plate D11 with a bead D11a, similar to the gasket A.

In the gasket D, however, the upper plate D10 is further provided with a stepped portion D10f between the base section D10a and the inclined wall D10b. Namely, the base section D10a is located in a middle level of the inclined wall D10b to form the stepped portion D10f.

When the gasket D is tightened, the stepped portion D10f deforms as well as the inclined wall D10b and the bead D11a to seal around the cylinder bore Hc. Therefore, an area around the cylinder bore Hc is sealed more widely than the gasket A. The rest of the structure and operation of the gasket D is the same as the gasket A.

Figure 6:
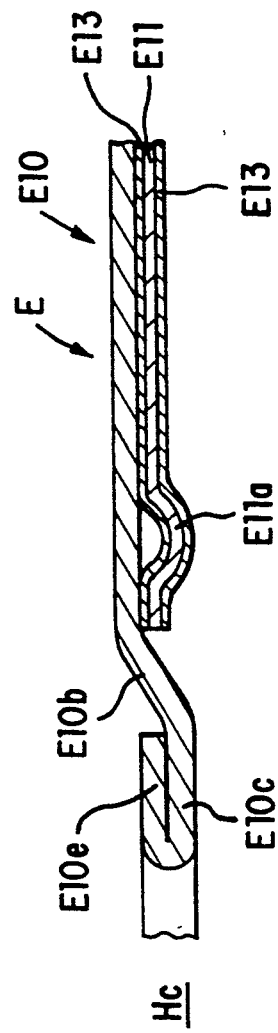

FIG. 6 shows a fifth embodiment E of a steel laminate gasket of the invention. The gasket E includes an upper plate E10 with an inclined wall E10b and upper and lower inner portions E10e, E10c, and a lower plate E11 with a bead E11a, similar to the gasket A.

In the gasket E, however, soft coatings E13 are further provided on both sides of the lower plate E11. Since the soft coating E13 are formed on the lower plate E11, which is not directly exposed to the cylinder bore Hc, the soft coating, such as gum or silicon resin, which is not strong against heat but effective to seal fluid may be used.

On the outer surface of the upper plate E10, a coating or plating which is strong against heat may be applied. The gasket E is especially useful for sealing around the fluid holes as well as the cylinder holes Hc.

Figure 7:
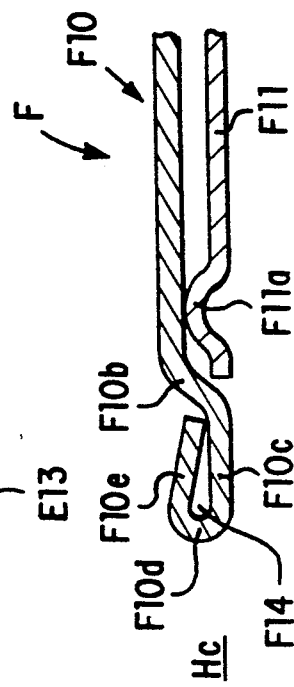

FIG. 7 shows a sixth embodiment F of a steel laminate gasket of the invention. The gasket F includes an upper plate F10 with an inclined wall F10b and upper and lower inner portions F10e, F10c, and a lower plate F11 with a bead F11a, similar to the gasket A.

In the gasket F, however, the upper inner portion F10e is connected to the lower inner portion F10c through a curved portion F10d such that a space F14 is formed between the upper and lower inner portions F10e, F10c.

When the gasket F is tightened, the space F14 is diminished so that the upper and lower inner portions F10e, F10c substantially form a solid portion thereat. When the space F14 is diminished at the initial stage of compression of the gasket, the curved portion F10d is compressed together with the inclined wall F10b to thereby prevent movement of the inclined wall F10b in the direction of the cylinder bore Hc. As a result, the curved portion F10b and the inclined wall F10b securely seal around the cylinder bore Hc.

In the present invention, the gasket is provided with more than three sealing portions around a hole to be sealed, which are spaced apart from each other. Therefore, the gasket can be securely sealed.

In particular, the gasket can be tightened strongly without deformation of the hole to be sealed by the flat solid portion. The gasket can also provide high resilient surface pressure outside the solid portion by the inclined wall and the bead. The area around the hole can be sealed non-resiliently and resiliently.

While the invention has been explained with reference to the specific embodiments of the invention, the explanation is illustrative and the present invention is limited only by the appended claims.

We claim:

1. A steel laminate gasket for an internal combustion engine having at least one hole therein, said gasket consisting essentially of first and second metal plates, said first metal plate including at least one first hole corresponding to the hole of the engine, first sealing means situated around the first hole to define and seal around the same, a base section extending substantially throughout an entire area of the gasket, and an embossed portion situated between the first sealing means and the base section, said embossed portion having an inclined wall, a highest portion, a flat top portion attached to the highest portion and a stepped portion extending downwardly from the flat top portion and situated between the flat top portion and the base section, said embossed portion and said stepped portion, when the gasket is tightened, resiliently deforming to provide surface pressures thereat and to seal around the first hole outside the first sealing means, and said second metal plate being situated under the base section of the first plate, said second plate having at least one second hole, the diameter of the second hole being larger than the diameter of the first sealing means to permit the second plate to pile over the base section without laying over the first sealing means when the gasket is assembled, and second sealing means formed on the second plate and situated around the second hole, said second sealing means, when the gasket is tightened, deforming to resiliently seal around the hole of the engine outside the embossed portion so that an area around the hole of the engine is sealed by the first sealing means, the embossed portion, the stepped portion and the second sealing means laterally spaced from each other to securely seal therearound.

2. A steel laminate gasket according to claim 1, wherein said second sealing means includes a bead formed in the second metal plate, said second metal plate including an inner edge around the second hole, said inner edge abutting against the inclined wall when the first and second metal plates are assembled together so that when the gasket is tightened, the inner edge and inclined wall push against each other to provide high sealing pressure at the inclined wall and the projection.

3. A steel laminate gasket according to claim 1, wherein said first sealing means includes a lower section attached to the lowest portion of the inclined wall, and an upper section situated above the lower section.

4. A steel laminate gasket according to claim 3, wherein said first sealing means further includes a curved portion situated between the upper and lower sections and defining the first hole, said upper section being turned to be closely placed above the lower section to form a solid portion thereat.

5. A steel laminate gasket according to claim 4, wherein a thickness of the first plate is thicker than that of the second plate so that the solid portion is thicker than the total thickness of the gasket outside thereof to prevent creep relaxation of the embossed portion and the second sealing means when the gasket is tightened.

6. A steel laminate gasket according to claim 1, wherein said second sealing means includes a projection formed in the second metal plate, said second metal plate including an inner edge around the second hole, said inner edge abutting against the inclined wall when the first and second metal plates are assembled together so that when the gasket is tightened, the inner edge and inclined wall push against each other to provide high sealing pressure at the inclined wall and the projection.

7. A steel laminate gasket according to claim 6, wherein said projection is a bead formed around the second hole and projecting in a direction away from the first plate.

* * * * *